United States Patent
Ye et al.

(10) Patent No.: US 12,289,606 B2
(45) Date of Patent: Apr. 29, 2025

(54) WIRELESS DEVICE INITIATED CHANNEL OCCUPANCY IN UNLICENSED SPECTRUM

(71) Applicant: Apple Inc., Cupertino, CA (US)

(72) Inventors: Sigen Ye, Whitehouse Station, NJ (US); Oghenekome Oteri, San Diego, CA (US); Weidong Yang, San Diego, CA (US); Wei Zeng, San Diego, CA (US); Hong He, Cupertino, CA (US); Yushu Zhang, Beijing (CN); Haitong Sun, Irvine, CA (US); Huaning Niu, San Jose, CA (US); Chunhai Yao, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 640 days.

(21) Appl. No.: 17/437,909

(22) PCT Filed: Oct. 15, 2020

(86) PCT No.: PCT/CN2020/121123
§ 371 (c)(1),
(2) Date: Sep. 10, 2021

(87) PCT Pub. No.: WO2022/077331
PCT Pub. Date: Apr. 21, 2022

(65) Prior Publication Data
US 2022/0303781 A1  Sep. 22, 2022

(51) Int. Cl.
*H04W 16/14* (2009.01)
*H04W 74/0808* (2024.01)
*H04W 76/10* (2018.01)

(52) U.S. Cl.
CPC ....... *H04W 16/14* (2013.01); *H04W 74/0808* (2013.01); *H04W 76/10* (2018.02)

(58) Field of Classification Search
CPC .. H04W 16/14; H04W 76/10; H04W 74/0808
See application file for complete search history.

(56) References Cited

U.S. PATENT DOCUMENTS

| 2017/0231011 | A1* | 8/2017 | Park | H04W 72/0446 |
| 2020/0053571 | A1* | 2/2020 | Tsai | H04W 74/0808 |
| 2020/0245353 | A1* | 7/2020 | Tsai | H04W 72/1268 |

FOREIGN PATENT DOCUMENTS

| CN | 110720252 A | 1/2020 |
| WO | 2019240512 A1 | 12/2019 |

(Continued)

OTHER PUBLICATIONS

International Search Report for PCT Patent Application No. PCT/CN2020/121123; mailed Jul. 14, 2021.

(Continued)

*Primary Examiner* — Ricky Q Ngo
*Assistant Examiner* — Stephen N Steiner
(74) *Attorney, Agent, or Firm* — Kowert, Hood, Munyon, Rankin & Goetzel, P.C.

(57) ABSTRACT

This disclosure relates to techniques for a wireless device to initiate channel occupancy in unlicensed spectrum in a wireless communication system. The wireless device may establish a wireless link with a cellular base station. The wireless device may determine to perform an uplink transmission to the cellular base station on an unlicensed frequency channel. The wireless device may determine whether the cellular base station has channel occupancy of the unlicensed frequency channel. The wireless device may determine whether to initiate channel occupancy of the unlicensed frequency channel. The decision whether to initiate channel occupancy may be based at least in part on whether the cellular base station has channel occupancy of the unlicensed frequency channel.

13 Claims, 7 Drawing Sheets

(56) References Cited

FOREIGN PATENT DOCUMENTS

| | | |
|---|---|---|
| WO | 2020162804 A1 | 8/2020 |
| WO | 2020194274 | 10/2020 |

OTHER PUBLICATIONS

Nokia et al. "On UL enhancements for IIoT/URLLC in unlicensed controlled environment" 3GPP TSG RAN WG1 Meeting #102-e R1-2006247; Aug. 7, 2020.

* cited by examiner

WIRELESS DEVICE INITIATED CHANNEL OCCUPANCY IN UNLICENSED SPECTRUM

PRIORITY CLAIM INFORMATION

This application is a national stage application of International Application No. PCT/CN2020/121123, filed on Oct. 15, 2020, titled "Wireless Device Initiated Channel Occupancy in Unlicensed Spectrum", which is hereby incorporated by reference in its entirety.

FIELD

The present application relates to wireless communications, and more particularly to systems, apparatuses, and methods for wireless devices to initiate channel occupancy in unlicensed spectrum in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for a wireless device to initiate channel occupancy in unlicensed spectrum in a wireless communication system.

According to the techniques described herein, a wireless device may determine whether to initiate channel occupancy of an unlicensed frequency channel to perform an uplink transmission, based on any of a variety of possible considerations.

Among such possible considerations may include whether a cellular base station (e.g., the serving cellular base station of the wireless device) has initiated channel occupancy of the unlicensed frequency channel. For example, if the cellular base station has initiated channel occupancy of the unlicensed frequency channel, the wireless device may be able to share that channel occupancy to perform the uplink transmission. Techniques are also described herein for the wireless device to determine whether a cellular base station has initiated channel occupancy of an unlicensed frequency channel, e.g., to support the ability of the wireless device to determine whether to initiate channel occupancy of the unlicensed frequency channel to perform the uplink transmission.

As further possible considerations, the wireless device may determine whether to initiate channel occupancy of the unlicensed frequency channel to perform the uplink transmission based on the length of the uplink transmission, and/or based on the latency sensitivity of the uplink transmission. For example, such considerations may cause the wireless device to initiate channel occupancy of the unlicensed frequency channel even if the cellular base station has already initiated channel occupancy of the unlicensed frequency channel, at least in some instances, such as when the length of the uplink transmission would be longer than the remainder of the channel occupancy and/or fixed frame period of the cellular base station, and/or when the uplink transmission is considered sufficiently latency sensitive that the wireless device initiating channel occupancy of the unlicensed frequency channel to perform the uplink transmission may be worthwhile to potentially reduce the latency of the uplink transmission.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
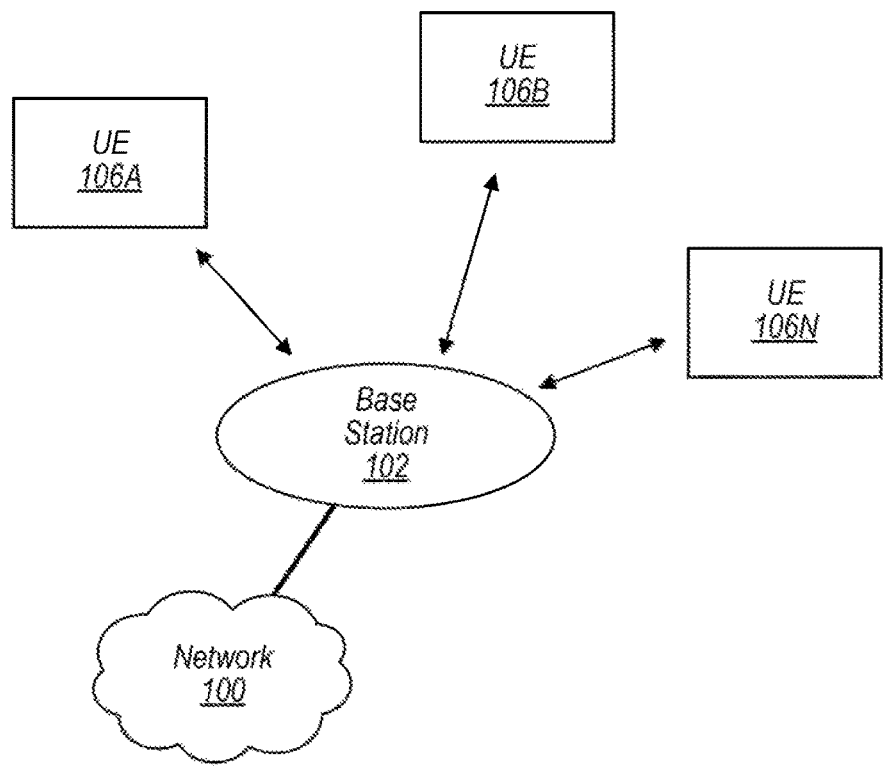
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
  UE: User Equipment
  RF: Radio Frequency
  BS: Base Station
  GSM: Global System for Mobile Communication
  UMTS: Universal Mobile Telecommunication System
  LTE: Long Term Evolution
  NR: New Radio
  NR-U: NR Unlicensed
  TX: Transmission/Transmit
  RX: Reception/Receive
  RAT: Radio Access Technology
  TRP: Transmission-Reception-Point
  DCI: Downlink Control Information
  CORESET: Control Resource Set
  CSI: Channel State Information
  CSI-RS: Channel State Information Reference Signals
  LBT: Listen-Before-Talk
  CCA: Clear Channel Assessment
  COT: Channel Occupancy Time
  FBE: Frame Based Equipment
  FFP: Fixed Frame Period Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "LIE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
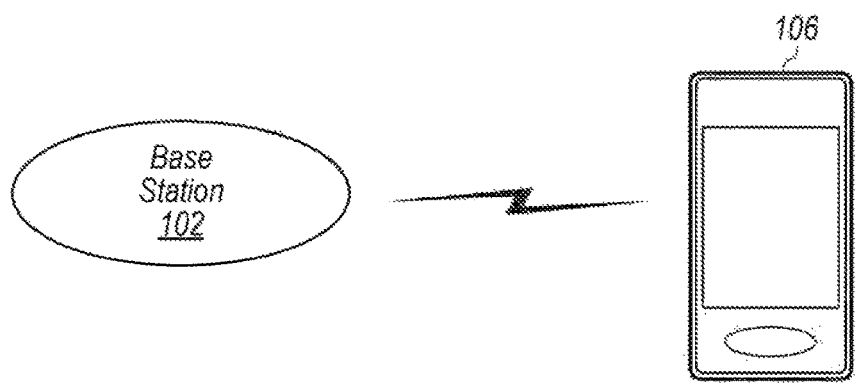
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, NR-U, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform robust uplink data transmission techniques, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
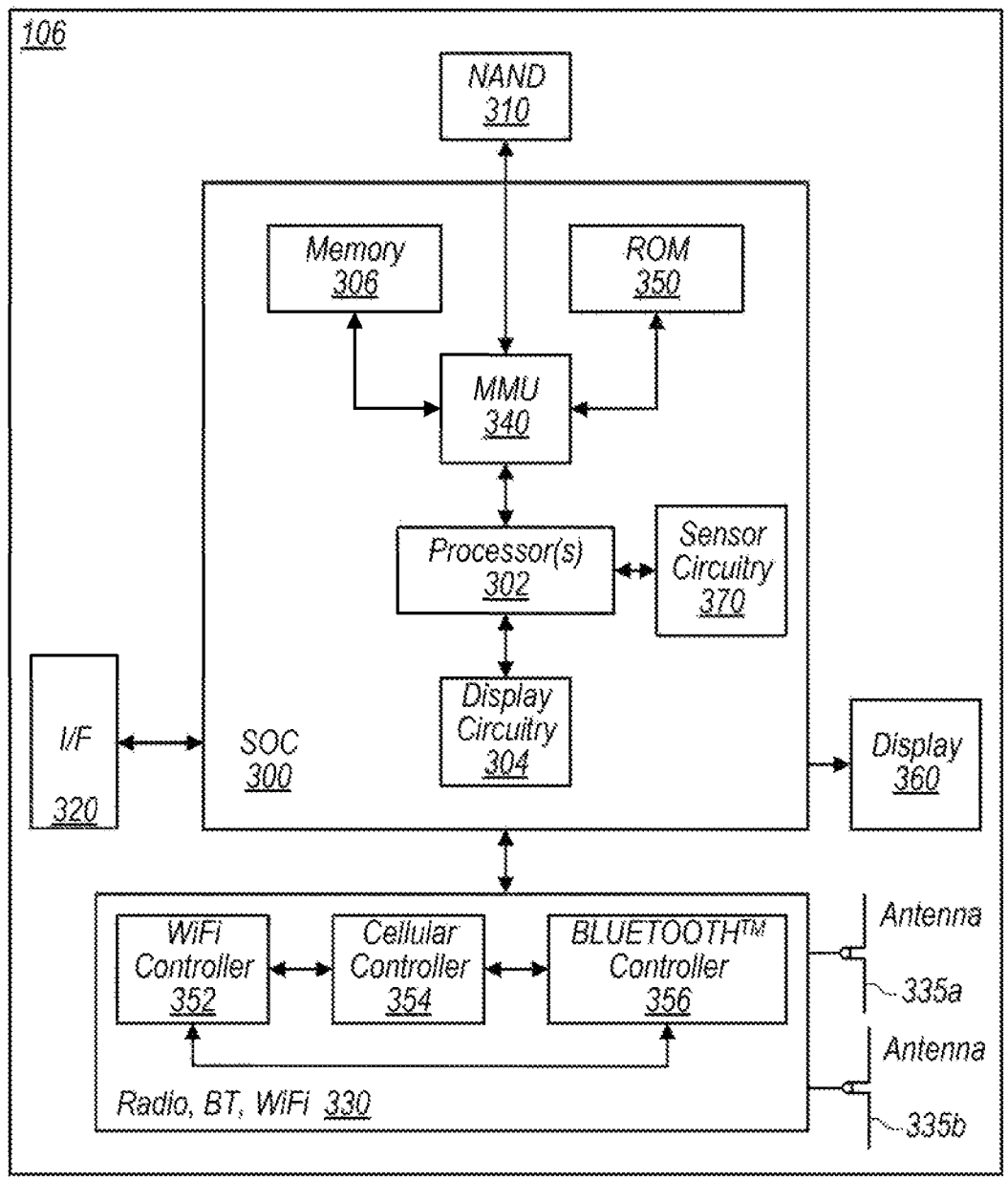
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to initiate channel occupancy in unlicensed spectrum, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to initiate channel occupancy in unlicensed spectrum according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
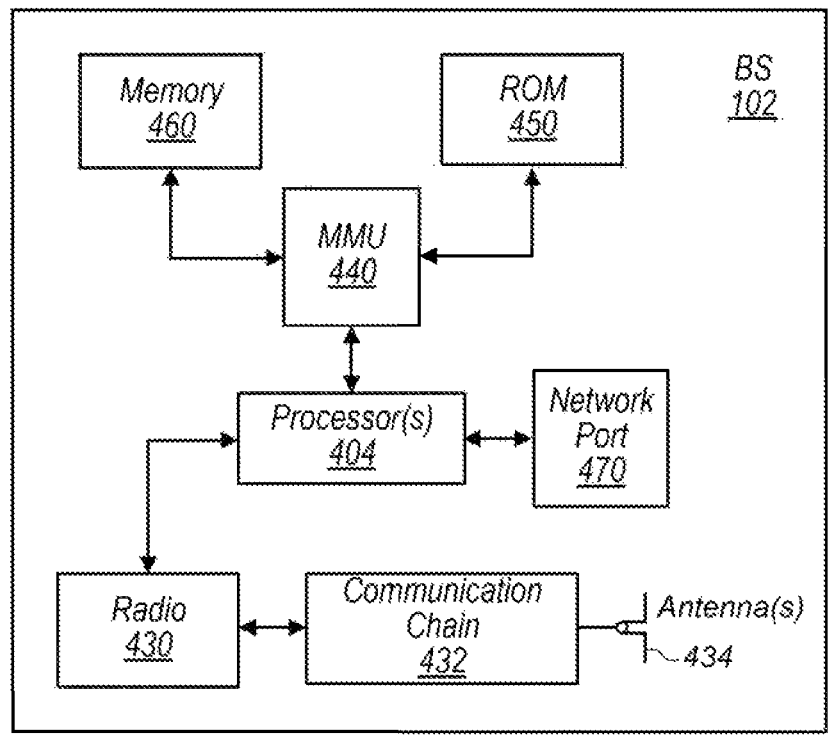
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
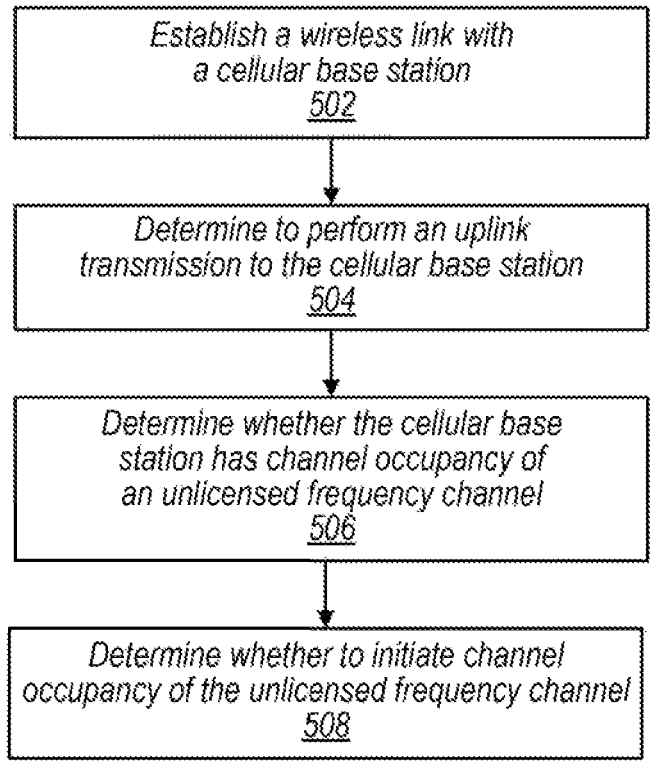
FIG. 5 is a flowchart diagram illustrating aspects of an exemplary possible method for a wireless device to initiate channel occupancy in unlicensed spectrum in a wireless communication system, according to some embodiments.

FIG. 5—Wireless Device Initiated Channel Occupancy in Unlicensed Spectrum

Wireless communication is being used for an increasingly broad set of use cases. Use of unlicensed spectrum for cellular communication may be included among a variety of areas of increasing study to further support the range of possible wireless communication uses. For example, cellular communication techniques for use in unlicensed spectrum, such as license assisted access (LAA) for LTE and NR unlicensed (NR-U), are generally considered areas of particular interest in the field of wireless communication.

Coexistence features may commonly be used for cellular communication in unlicensed spectrum, for example to improve quality of service obtained by wireless devices performing cellular, Wi-Fi, and/or other forms of communication in unlicensed spectrum, and/or to help improve cell capacity for carriers utilizing unlicensed spectrum. For example, the use of listen-before-talk (LBT) and other such collision avoidance techniques may be used to attempt to reduce the likelihood of collisions on a wireless medium.

At least some jurisdictions may regulate the use of unlicensed spectrum, for example by providing regulatory requirements for devices configured to use unlicensed spectrum, that may require certain features or behaviors, which may be intended to improve coexistence and fair use among devices attempting to perform wireless communication using that unlicensed spectrum. Accordingly, part of development of cellular communication techniques for use in unlicensed spectrum may include developing techniques that comply with regulatory requirements.

For example, according to a frame based equipment framework for channel access for unlicensed spectrum, it may be the case that wireless devices are expected to operate using fixed frame periods (FFPs), according to which transmissions by a given device may be constrained to begin in alignment with the beginning of the FFP for the device. Further, prior to the beginning of a FFP in which the device wishes to transmit, the device may be expected to perform a clear channel assessment (e.g., a LBT procedure) to determine whether the channel is available, and the device may be expected to refrain from transmitting during at least a certain portion of each FFP, which may be referred to as an idle period.

Currently, 3GPP 5G NR cellular communication techniques do not include techniques for a user equipment device to initiate their own channel access in unlicensed spectrum in accordance with such a FBE framework. Thus, it may be beneficial to provide such techniques, e.g., to expand the scope of possible cellular communication in unlicensed spectrum. Accordingly, FIG. 5 is a flowchart diagram illustrating a method for a wireless device to initiate channel occupancy in unlicensed spectrum in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. At least in some instances, establishing the wireless link(s) may include the wireless device providing capability information for the wireless device. Such capability information may include information relating to any of a variety of types of wireless device capabilities.

After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

Additionally or alternatively, the wireless device may be configured to use multiple component carriers. It may be the case that at least one component carrier configured for the wireless device includes a component carrier that is deployed in unlicensed spectrum (e.g., an unlicensed frequency channel).

In 504, the wireless device may determine to perform an uplink transmission to the cellular base station on an unlicensed frequency channel. The uplink transmission may be scheduled by the cellular base station, for example using a configured grant, dynamic grant, or other mechanism for scheduling the wireless device to perform the uplink transmission on the unlicensed frequency channel. The wireless device may determine an expected length of the uplink transmission, e.g., based on the scheduling information from the cellular base station, and/or based on an amount of data and/or control signaling to be included in the uplink transmission, and/or any of various other possible considerations.

In 506, the wireless device may determine whether the cellular base station has initiated channel occupancy of the unlicensed frequency channel. Determining whether the cellular base station has initiated channel occupancy may include determining whether the cellular base station is using a channel occupancy time (COT) portion of its own FFP, or whether it is sharing the COT portion of another wireless device's FFP (e.g., that was initiated by that wireless device).

Such determination of whether the cellular base station has initiated channel occupancy of the unlicensed frequency channel may be performed in any of various ways. As one possibility, the wireless device may determine that the cellular base station has initiated channel occupancy of the unlicensed frequency channel based at least in part on whether the wireless device detects a downlink transmission from the cellular base station on the unlicensed frequency channel. For example, it may be the case that the cellular base station is configured to transmit broadcast or multicast signals and channels only during COT that it has initiated in conjunction with its own FFP, but not during a shared COT that has been initiated by a wireless device, such that any broadcast or multicast signals and/or channels received by the wireless device on the unlicensed frequency channel can function as an indicator that the cellular base station has initiated channel occupancy of the unlicensed frequency channel. Note that in such a scenario, the cellular base station may at times transmit unicast signals and/or channels during COT that it did not initiate; for example, the cellular base station may transmit such unicast signals and/or channels to a wireless device that is sharing COT initiated by the wireless device during its FFP with the cellular base station. If the cellular base station has broadcast or multicast signals and/or channels scheduled during such a COT shared by a wireless device, the cellular base station may discard or puncture the broadcast or multicast signals and/or channels. Alternatively, if the cellular base station has broadcast or multicast signals and/or channels scheduled during such a COT shared by a wireless device, the cellular base station may choose to initiate its own COT in accordance with its own FFP to be able to transmit the broadcast or multicast signals and/or channels, e.g., instead of sharing the COT of the wireless device.

As another possibility for determining whether the cellular base station has initiated channel occupancy of the unlicensed frequency channel, the cellular base station may provide explicit and/or implicit signaling of whether the cellular base station has initiated channel occupancy of the unlicensed frequency channel. For example, the cellular base station may provide an indication of whether the cellular base station has initiated channel occupancy of the unlicensed frequency channel in downlink control information (DCI) provided by the cellular base station on the unlicensed frequency channel. As one such possibility, the DCI may be transmitted at the beginning of the FFP of the cellular base station (or at another known/fixed time/location), and may include a field that is configured to indicate whether the cellular base station has initiated channel occupancy of the unlicensed frequency channel. The wireless device may accordingly receive the DCI and determine from the appropriate field whether the cellular base station has initiated channel occupancy of the unlicensed frequency channel.

As another example, the cellular base station may provide an indication of whether the cellular base station has initiated channel occupancy of the unlicensed frequency channel using a reference signal configuration provided by the cellular base station on the unlicensed frequency channel. As one such possibility, reference signals that are configured to indicate whether the cellular base station has initiated channel occupancy of the unlicensed frequency channel may be transmitted at the beginning of the FFP of the cellular base station (or at another known/fixed time/location). The wireless device may accordingly receive the reference signals and determine from the configuration whether the cellular base station has initiated channel occupancy of the unlicensed frequency channel.

In 508, the wireless device may determine whether to initiate channel occupancy of the unlicensed frequency channel, e.g., to perform the uplink transmission. The wireless device may determine whether to initiate channel occupancy of the unlicensed frequency channel based at least in part on whether the cellular base station has initiated channel occupancy of the unlicensed frequency channel. For example, as one possibility, the wireless device may determine to initiate channel occupancy of the unlicensed frequency channel if the cellular base station has not initiated channel occupancy of the unlicensed frequency channel, and may determine to not initiate channel occupancy of the unlicensed frequency channel if the cellular base station has initiated channel occupancy of the unlicensed frequency channel. In such a scenario, the wireless device may perform the uplink transmission using channel occupancy initiated by the wireless device if the cellular base station has not initiated channel occupancy of the unlicensed frequency channel, and may perform the uplink transmission using channel occupancy shared by the cellular base station if the cellular base station has initiated channel occupancy of the unlicensed frequency channel.

In some instances, the determination by the wireless device of whether to initiate channel occupancy of the unlicensed frequency channel may additionally or alternatively be based at least in part on one or more other considerations. For example, in some instances, the determination may be based at least in part on the length of the uplink transmission, e.g., depending on how the length of the uplink transmission compares to the remaining length of channel occupancy initiated by the cellular base station, and/or how the length of the uplink transmission compares to the remaining length of the current fixed frame period of the cellular base station.

For example, as one such possibility, the wireless device may determining to initiate channel occupancy of the unlicensed frequency channel if the length of the uplink transmission is greater than a remaining length of channel occupancy initiated by the cellular base station (or if the cellular base station has not initiated channel occupancy of the unlicensed frequency channel). In such a scenario, in contrast, the wireless device may determine to not initiate channel occupancy of the unlicensed frequency channel if the length of the uplink transmission is less than the remaining length of channel occupancy initiated by the cellular base station. For example, if the length of the uplink transmission is less than the remaining length of channel occupancy initiated by the cellular base station, it may be the case that the remaining length of channel occupancy initiated by the cellular base station provides sufficient time to complete the uplink transmission, whereas if the length of the uplink transmission is greater than the remaining length of channel occupancy initiated by the cellular base station, it may be the case that the remaining length of channel occupancy initiated by the cellular base station provides insufficient time to complete the uplink transmission, and the wireless device may be able to obtain more channel access time to complete the uplink transmission by initiating its own channel occupancy.

According to another alternative, the wireless device may determine to initiate channel occupancy of the unlicensed frequency channel if the length of the uplink transmission is greater than a remaining length of the current fixed frame period of the cellular base station (or if the cellular base station has not initiated channel occupancy of the unlicensed frequency channel). In such a scenario, in contrast, the wireless device may determine to not initiate channel occupancy of the unlicensed frequency channel if the length of the uplink transmission is less than the remaining length of the current fixed frame period of the cellular base station. Such an approach may avoid or at least reduce the likelihood of a scenario in which the wireless device and the cellular base station together occupy the channel to an extent that there is minimal opportunity for other devices to utilize the channel, at least according to some embodiments.

As a still further possibility, the wireless device may autonomously determine whether to initiate channel occupancy of the unlicensed frequency channel including when the cellular base station has initiated channel occupancy of the unlicensed frequency channel. In some such instances, the determination by the wireless device of whether to initiate channel occupancy of the unlicensed frequency channel may be based at least in part on whether CCA is needed if it shares the channel occupancy initiated by the cellular base station. For example, if CCA is not needed when sharing the channel occupancy initiated by the cellular base station (e.g. as indicated by the cellular base station because the gap between downlink transmission and uplink transmission is sufficiently small), it may be considered advantageous for the wireless device to share the channel occupancy initiated by the cellular base station instead of initiating its own channel occupancy.

As another possibility, the determination by the wireless device of whether to initiate channel occupancy of the unlicensed frequency channel may be based at least in part on the latency sensitivity of the uplink transmission. For example, the wireless device may distinguish between certain uplink transmissions that are considered relatively latency sensitive (e.g., ultra reliable low latency communication (URLLC) transmissions, as one possibility) and uplink transmissions that are considered less latency sensitive (e.g., Best Effort transmissions, as one possibility). For more latency sensitive transmissions, the wireless device may be more likely to determine to initiate channel occupancy of the unlicensed frequency channel rather than share channel occupancy initiated by the cellular base station to perform the uplink transmission than for less latency sensitive transmissions, at least according to some embodiments. For example, it may be possible for the wireless device to utilize a different energy detection threshold when initiating channel occupancy of the unlicensed frequency channel (e.g., an energy detection threshold that is calculated based on a maximum transmit power of the wireless device) than when sharing channel occupancy initiated by the cellular base station (e.g., an energy detection threshold that is configured by the cellular base station, which may be based on a maximum transmit power of the cellular base station, which may be greater than the maximum transmit power of the wireless device). This may increase the likelihood that clear channel assessment when initiating channel occupancy of the unlicensed frequency channel is successful compared to when sharing channel occupancy initiated by the cellular base station, which may in turn increase the likelihood that the uplink transmission can be performed with a lower latency.

Note further that when attempting to initiate channel occupancy of the unlicensed frequency channel, it may be the case that the wireless device can select the energy detection threshold used by the wireless device to perform clear channel assessment from multiple possible energy detection thresholds. For example, the wireless device may be able to choose from an energy detection threshold that is calculated based on a maximum transmit power of the wireless device and an energy detection threshold that is configured by the cellular base station. Thus, the wireless device could select the energy detection threshold that is calculated based on a maximum transmit power of the wireless device in some instances (e.g., for a relatively latency sensitive uplink transmission, e.g., as previously noted), though it might be the case that the cellular base station would be unable to use the channel occupancy initiated in such a manner, or could select the energy detection threshold that is configured by the cellular base station in some instances (e.g., for a less latency sensitive uplink transmission), which may decrease the likelihood that the clear channel assessment will be successful, but may result in the cellular base station being able to use the channel occupancy if the clear channel assessment is successful.

At least in some instances, if the wireless device determines to initiate channel occupancy of the unlicensed frequency channel while the cellular base station has initiated channel occupancy of the unlicensed frequency channel, the wireless device may perform the uplink transmission to the cellular base station on the unlicensed frequency channel in such a manner that the uplink transmission extends at least into a clear channel assessment period for a next fixed frame period of the cellular base station in certain cases (e.g., when the uplink transmission overlaps with the idle period of the FFP of the cellular base station). The wireless device may operate in such a manner based at least in part on the channel occupancy being initiated while the cellular base station has already initiated channel occupancy of the unlicensed frequency channel, for example to ensure that the cellular base station does not initiate channel occupancy again in the next fixed frame period of the cellular base station, which could result in near-continuous use of the channel by the cellular base station and the wireless device, potentially over multiple FFPs of the cellular base station and the wireless device.

Once the wireless device has determined whether to initiate channel occupancy to perform the uplink transmission (e.g., or to share channel occupancy initiated by the cellular base station), the wireless device may perform clear channel assessment (e.g., using an appropriate ED threshold) if needed, and (e.g., if the clear channel assessment is successful or not needed) may perform the uplink transmission on the unlicensed frequency channel.

Thus, the method of FIG. 5 may be used to provide a framework for a wireless device to determine whether and when to initiate channel occupancy in unlicensed spectrum in a wireless communication system. Such a framework may be particularly useful for cellular communications performed between a cellular base station and a wireless device on an unlicensed frequency channel in a relatively coordinated manner, at least according to some embodiments.

FIGS. 6-11 and Additional Information

FIGS. 6-11 illustrate further aspects that might be used in conjunction with the method of FIG. 5 if desired. It should be noted, however, that the exemplary details illustrated in and described with respect to FIGS. 6-11 are not intended to be limiting to the disclosure as a whole: numerous variations and alternatives to the details provided herein below are possible and should be considered within the scope of the disclosure.

Access to and use of unlicensed spectrum for wireless communication may be subject to certain regulatory requirements. For example, ETS1 EN 301 893 (5 GHz RLAN; Harmonised Standard covering the essential requirements of article 3.2 of Directive 2014/53/EU) may provide regulatory requirements for channel access for unlicensed spectrum for load based equipment (LBE) and frame based equipment (FBE).

Figure 6:
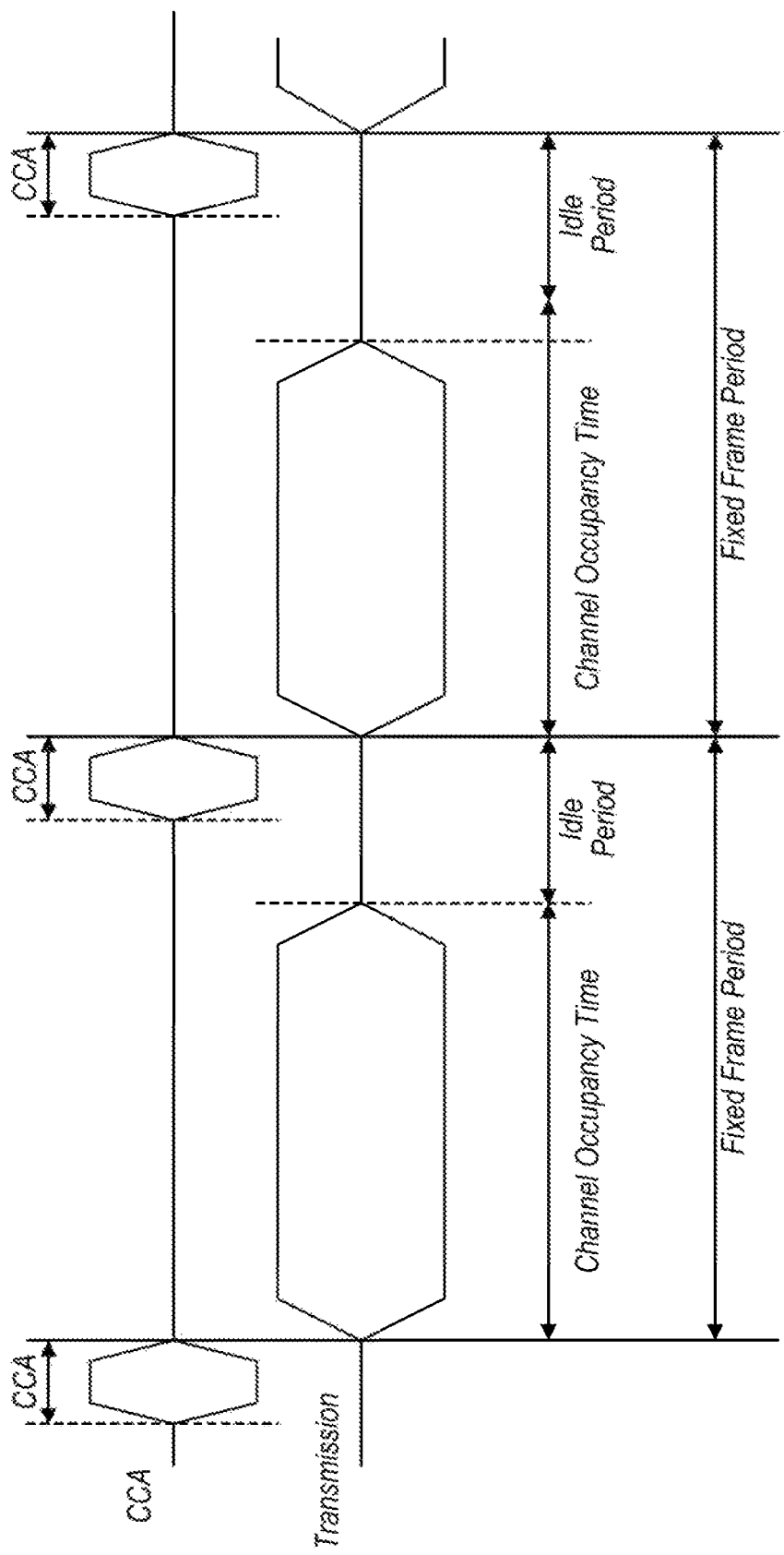
FIG. 6 illustrates exemplary aspects of a possible frame based equipment (FBE) framework for performing wireless communication in unlicensed spectrum, according to some embodiments.

For FBE, it may be the case that each device has a fixed frame period (FFP). In order to access an unlicensed frequency channel, a device may be expected to perform clear channel assessment (e.g., for a specified amount of time, such as one slot or 9 µs) before the start of each FFP to determine whether the channel is available for the device to transmit in that FFP. If such a listen-before-talk procedure is successful (e.g., if the medium is determined to be available), the device may be able to transmit during a certain portion of the FFP, which may be referred to as channel occupancy time or COT). Additionally, it may be the case that an idle portion of each FFP is specified, in which the device does not transmit (e.g., even if the CCA was successful and the device does transmit during the COT), which may have a certain minimum duration, such as max (5% of FFP, 100 µs). FIG. 6 illustrates exemplary aspects of such a possible FBE framework for performing wireless communication on unlicensed spectrum.

In 3GPP Release 16 NR-U, techniques for a gNB to initiate COT according to such a FBE framework are provided, but techniques for UE initiated COT for FBE have not been specified. Accordingly, it may be beneficial to provide techniques that can support UE initiated COT for FBE, e.g., to expand the usability of unlicensed spectrum for NR cellular communication, among various possible benefits.

Figure 7:
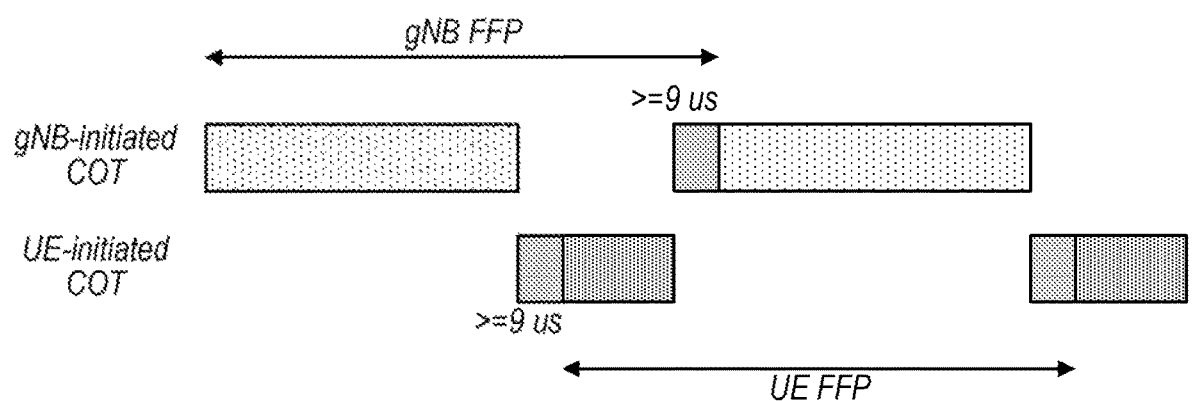
FIGS. 7-11 illustrate exemplary aspects of various possible scenarios that could occur when performing cellular communication in unlicensed spectrum using a FBE framework, according to some embodiments.

In order to provide such support, one consideration may include determining when a UE should (e.g, is allowed to) initiate its own COT. As part of such a consideration, it may be worthwhile to specify behavior that can avoid excessive resource use by a coordinated set of devices, such as a gNB and a UE that is scheduled by the gNB, at least according to some embodiments. For example, FIG. 7 illustrates exemplary aspects of a scenario in which a gNB could carefully schedule a UE transmission such as to leave significantly less than the idle period configured or specified for a single FFP device. In such a scenario, as shown, the gNB may schedule the UE such as to leave a 9 µs channel sensing period after its COT and before the UE FFP begins, and similarly to leave a 9 µs channel sensing period after the UE COT and before the next gNB FFP begins. Such a scheme may thus potentially limit the opportunities for other devices to obtain channel access.

Figure 8:
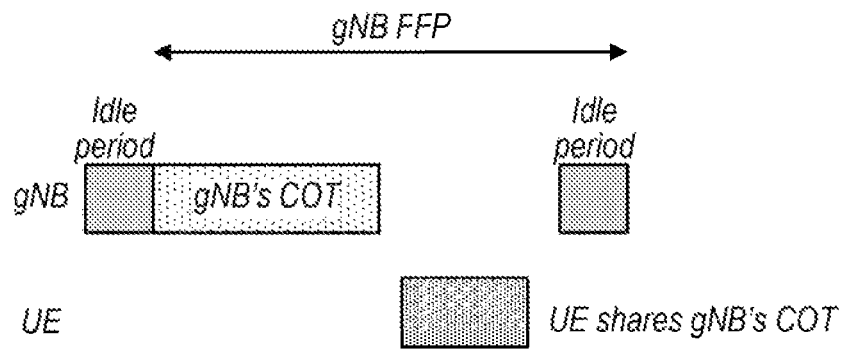
Figure 9:
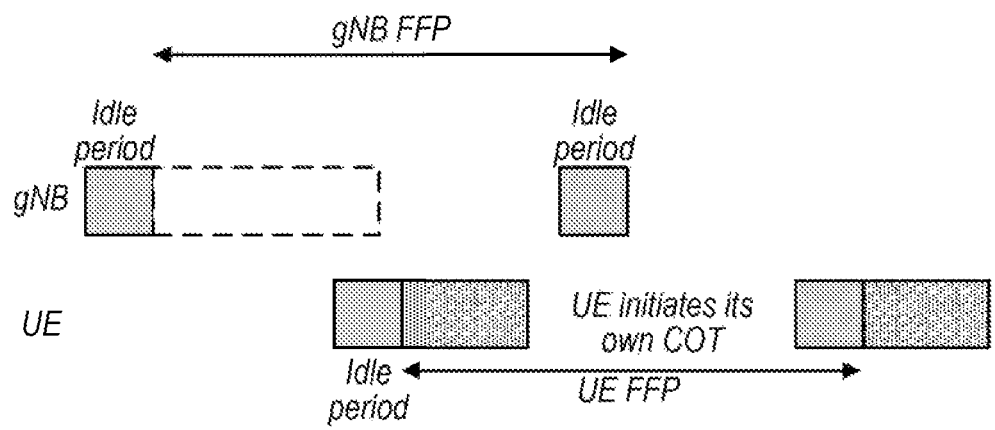
Figure 10:
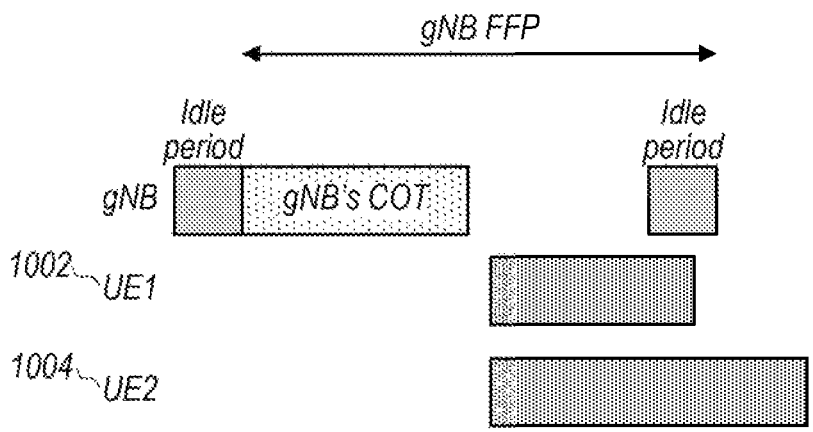

FIGS. 8-10 illustrate exemplary aspects of various other possible scenarios that might or might not be supported according to various possible frameworks for a UE to determine whether to initiate its own COT. In particular, FIG. 8 illustrates aspects of a scenario in which a UE shares a gNB's COT, FIG. 9 illustrates aspects of a scenario in which a UE initiates its own COT outside of a gNB's COT, and FIG. 10 illustrates aspects of a scenario in which a UE initiates its own COT during a gNB's COT.

According to some embodiments, it may be the case that a UE can be configured to initiate its own COT when the UE has a transmission to perform outside of a gNB initiated COT, such as in the scenario illustrated in FIG. 9. In such a scenario, the UE may be configured with an energy detection (ED) threshold for CCA, which may be based on the gNB maximum transmit power, e.g., such that the UE may be able to share the COT with the gNB. As another possibility, the UE may be able to calculate the ED threshold for CCA based on its own maximum transmit power. In such a case, it may be possible that the UE is not able to share the COT with the gNB (e.g., since the ED threshold used for the CCA might not meet regulatory requirements for gNB transmission if the gNB has a higher maximum transmit power than the UE, as may be common). In some instances, it may be possible for a UE to autonomously choose whether to use the ED threshold configured by the gNB (e.g., in order to potentially be able to share the COT with the gNB) or to use its own ED threshold (e.g., which may provide a greater chance to access the channel, but may preclude sharing the COT with the gNB).

If the UE has a transmission to perform within a gNB initiated COT, there may be several possible options for how the UE can determine whether to initiate its own COT. As one possibility, it may be the case that the UE always determines not to initiate its own COT if the start of the UE's transmission falls within gNB initiated COT, and instead always shares the gNB's COT. Such a framework may prevent the possibility that the channel usage pattern of FIG. 7 could occur, which may in turn allow greater channel access by other devices. Such a framework may also support the scenarios of FIGS. 8-9, but may not support the scenario of FIG. 10. For example, if a UE's transmission falls in a gNB initiated COT, it may be the case that the transmission cannot overlap with the gNB-FFP's idle period (or cross the gNB-FFP's boundary), e.g., because the UE may be required to share the gNB's FFP according to such a framework. Furthermore, it may be the case that if the start of the UE's transmission falls in a gNB initiated COT, the UE may be subject to use of the gNB's ED threshold, which may result in a lower likelihood of sensing the channel as idle than if the ED threshold were determined for the UE itself.

As another possibility, it may be the case that the UE is required to or otherwise configured to determine not to initiate its own COT if the UE's transmission falls entirely within a gNB initiated COT, but that if the start of the UE's transmission falls within a gNB initiated COT and the transmission overlaps with the gNB-FFP's idle period, the UE may determine to initiate its own COT. In some instances, according to such a framework, the gNB may configure whether and/or how the UE is allowed to initiate its own COT if the transmission overlaps with the gNB-FFP's idle period. Such a framework may not prevent the possibility that the channel usage pattern of FIG. 7 could occur, at least according to some embodiments. The scenarios of all of FIGS. 8-10 may also be supported by such a framework. Such a framework may limit a UE to use of the gNB's ED threshold if the UE's transmission falls entirely in a gNB initiated COT. As a variation on this framework, it could be the case that if a UE's transmission falls entirely within a gNB initiated COT plus the idle period, the UE is required to or otherwise configured to determine not to initiate its own COT, but that if the start of the UE's transmission falls within a gNB initiated COT and the transmission crosses the gNB-FFP's boundary, the UE may determine to initiate its own COT. This variant may prevent the possibility that the channel usage pattern of FIG. 7 could occur, as well as the transmission of UE1 1002 of FIG. 10, while permitting the transmission of UE2 1004 of FIG. 10, at least according to some embodiments.

As a still further possibility, if the start of a UE's transmission falls within a gNB initiated COT, it may be the case that the UE can autonomously choose whether to share the gNB's COT or initiate its own COT. Such a framework may support all of the scenarios of FIGS. 7-10, and may allow the UE to flexibly choose between sharing the gNB's COT (e.g., using the gNB's ED threshold) or initiating its own COT (e.g., using its own potentially higher ED threshold calculated based on its own maximum transmit power) for any of a variety of possible reasons. For example, in some instances, the UE could determine whether to share the gNB's COT or initiate its own COT (and/or whether to use the gNB's ED threshold or the UE's ED threshold) based on whether CCA is needed if it shares the gNB's COT and/or latency requirements for the transmission. Thus, if CCA is not needed when sharing the gNB's COT, the UE may determine to share the gNB's COT. Otherwise (or alternatively), for a URLLC transmission or other transmission with relatively strict latency requirements, the UE could determine to initiate its own COT with its own ED threshold, e.g., to increase the likelihood of being able to perform the transmission more quickly, while for a transmission with less strict latency requirements, the UE could determine to share the gNB's COT and/or to use the gNB's ED threshold, at least as one possibility. As a variation on this framework, it could be the case that if the UE's transmission starts within a gNB initiated COT, and if the transmission overlaps with the gNB-FFP's idle period, the UE is required to or otherwise configured to determine it initiate its own COT, and for the transmission to at least overlap with the sensing slot for the gNB's next FFP. This variant thus may either prevent the gNB-FFP's idle period from being used by the gNB/UE, or may prevent the gNB from acquiring the next FFP, thus preventing the possibility that the channel usage pattern of FIG. 7 could occur, while providing more opportunities for other devices sharing the spectrum to access the channel, at least according to some embodiments.

Note that while in the example scenarios of FIGS. 7-10, the periodicity of the FFPs of the gNB and UEs is the same, scenarios in which the periodicity of the FFPs of the gNB and UEs do not match are also possible. For example, the UE's FFP could be configured based on the periodicity for a configured grant PUSCH configuration, which may be determined by traffic characteristics, which may or may not be aligned in a consistent manner with the periodicity of the gNB's FFP. In such a scenario, it may not always be possible to avoid overlap between a UE's transmission and a gNB-FFP's idle period, in which case it may be particularly beneficial to support the possibility of a transmission pattern similar to that illustrated in FIG. 10, at least according to some embodiments.

It should also be noted that, at least according to some embodiments, it may be the case that when a gNB or UE initiates a COT, the COT may extend for the entire FFP for the gNB or UE except for the idle period. In some instances, it may be the case that the UE is required or otherwise configured to attempt to initiate a COT only if its transmission starts at the FFP boundary for the UE, e.g., in accordance with a FBE framework.

Because in at least some instances a UE's determination of whether to initiate its own COT may depend at least in part on whether a gNB's COT is already occurring, another consideration for providing support for UE initiated COT in a FBE framework for cellular communication in unlicensed spectrum may include how a UE can determine when a gNB's COT is occurring.

Figure 11:
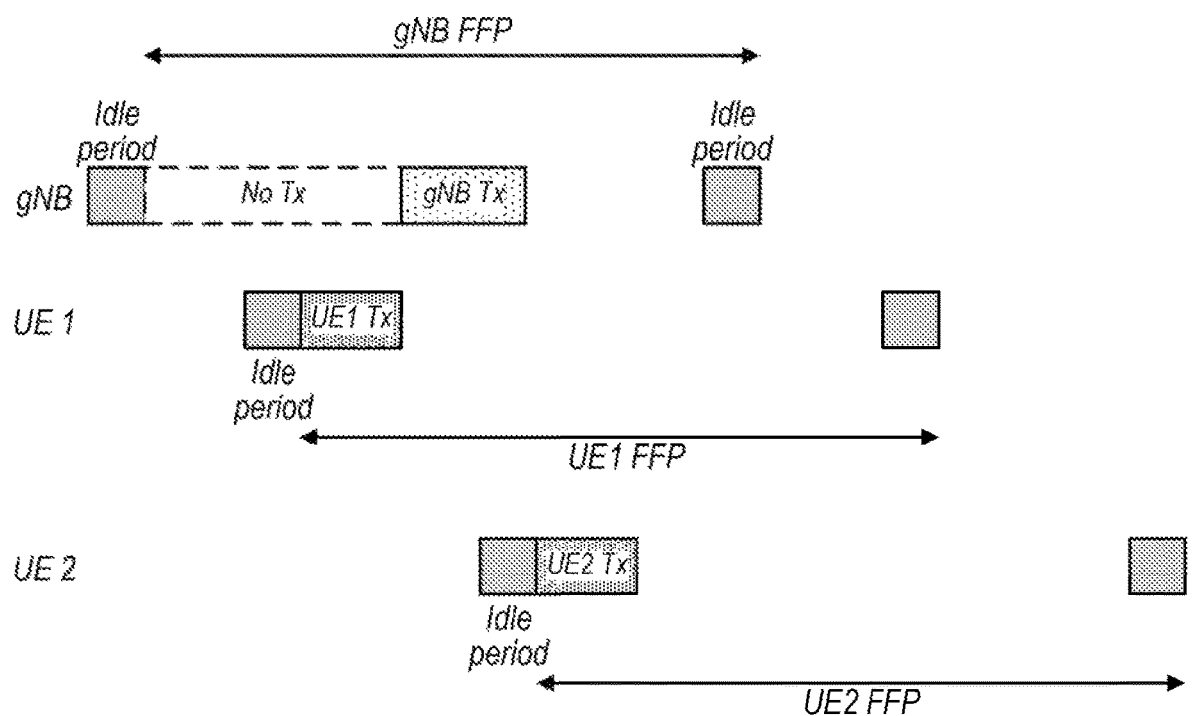

As one such possibility, the UE may determine that it is within a gNB's COT for an unlicensed frequency channel for a given FFP of the gNB if the UE detects any downlink transmission from the gNB during the FFP. Such downlink transmissions could include any unicast or broadcast transmissions, such as broadcast/unicast/group-common physical downlink control channel (PDCCH) transmissions, broadcast/unicast physical downlink shared channel (PDSCH) transmissions, channel state information reference signal (CSI-RS) transmissions, synchronization signal block (SSB) transmissions, etc. Such a technique may be effective in a communication framework in which gNB initiated COT is possible and UE initiated COT is not possible, or in which a gNB cannot share a UE initiated COT, at least according to some embodiments, and thus may be used by at least some 3GPP Release 16 FBE UEs. However, if a gNB can share a UE initiated COT, such a technique may not be able to effectively distinguish a gNB transmission that uses a gNB initiated COT from a gNB transmission that uses a UE initiated COT that is shared with the gNB by another UE. Thus, a UE using such a technique could result in the UE determining that a gNB initiated COT is occurring when the gNB is actually using a COT initiated by another UE, and the UE in turn using the COT initiated by the other UE, which may not be allowed by regulations. FIG. 11 illustrates exemplary aspects of such a possible scenario.

Accordingly, another possible option for a UE to determine whether it is within a gNB's COT may include the use of downlink control information (e.g., 3GPP DCI Format 2_0) by the gNB to indicate whether a downlink transmission is part of a gNB initiated COT. Such downlink control information could be provided at the beginning of the gNB's FFP and/or in one or more other slots. The downlink control information could provide such information using one bit, for example with one value (e.g., "1") indicating gNB initiated COT for the component carrier (CC), and another value (e.g., "0") indicating that the gNB has not initiated COT for the CC (e.g., the indication could be transmitted on a different CC, or the gNB could be using a UE initiated COT). Such a technique may prevent the scenario of FIG. 11 from occurring for UEs that are configured accordingly (e.g., potentially including 3GPP Release 17 UEs), but may not prevent legacy UEs (e.g., potentially including 3GPP Release 16 UEs) that are configured to determine that a gNB's COT is occurring if the UE detects any downlink transmission from the gNB from causing such a scenario.

As another possibility, a reference signal configuration (CSI-RS/tracking reference signal (TRS)) that is always present in the first slot (or other pre-defined location) of the COT could be used to indicate whether a downlink transmission is part of a gNB initiated COT. Such an approach may also allow for UEs to perform time/frequency tracking and/or other measurements using the configured reference signals at the beginning of the gNB COT, at least according to some embodiments. Such a technique may also prevent the scenario of FIG. 11 from occurring for UEs that are configured accordingly (e.g., potentially including 3GPP Release 17 UEs), but may not prevent legacy UEs (e.g., potentially including 3GPP Release 16 UEs) that are configured to determine that a gNB's COT is occurring if the UE detects any downlink transmission from the gNB from causing such a scenario. In some instances, if such an approach is used, it may be beneficial for a gNB to avoid configuring the reference signals in PDCCH resources allocated to such legacy UEs, e.g., because it may be the case that the legacy UEs would not rate match around those resource elements. PDSCH rate matching could be addressed by configuring the proper rate matching patterns for the legacy UEs.

As a further possibility, the gNB may be required or otherwise configured to only transmit unicast transmissions to a UE whose shared COT it is using. The unicast transmissions may include unicast PDSCH, unicast PDCCH carrying DL/UL grant(s), aperiodic CSI-RS, etc. If the gNB's transmission overlaps with broadcast/multicast signals/channels (e.g., SSB, broadcast PDCCH/PDSCH, periodic CSI-RS shared with multiple UEs, etc.), the gNB may silently discard the broadcast/multicast signals/channels (e.g., in the case of PDCCH/PDSCH, as one possibility), puncture the broadcast/multicast signals/channels (e.g., in the case of SSB and CSI-RS, as one possibility), or may initiate its own COT to transmit instead of using a UE initiated COT (e.g., if the broadcast/multicast transmission aligns with the FFP boundary). Such a scheme may reduce UE opportunities to perform intra-/inter-cell measurements and/or beam measurements, but may prevent the scenario of FIG. 11 from occurring, potentially both for newer UEs and legacy UEs.

As a still further possibility, it may be left to the gNB's implementation to make sure other UEs would not detect any downlink transmissions in a UE-shared COT. For example, the gNB may transmit a dummy DCI at the beginning of the COT, or may choose not to transmit any broadcast/multicast signal in UE initiated COT (e.g., by discarding or puncturing the broadcast/multicast signal or instead initiating its own COT). As another example, for a CSI-RS based approach to indicating whether a downlink transmission is part of a gNB initiated COT, the gNB could provide different configurations for legacy (e.g., Release 16) and newer (e.g., Release 17) UEs, so that there would be no sharing across the different sets of UEs.

In the following further exemplary embodiments are provided.

One set of embodiments may include a baseband processor configured to perform operations comprising: establishing a wireless link with a cellular base station; determining to perform an uplink transmission to the cellular base station on an unlicensed frequency channel; determining whether the cellular base station has initiated channel occupancy of the unlicensed frequency channel; and determining whether to initiate channel occupancy of the unlicensed frequency channel based at least in part on whether the cellular base station has initiated channel occupancy of the unlicensed frequency channel.

According to some embodiments, the baseband processor is further configured to perform operations comprising: determining to initiate channel occupancy of the unlicensed frequency channel if the cellular base station has not initiated channel occupancy of the unlicensed frequency channel; and determining to not initiate channel occupancy of the unlicensed frequency channel if the cellular base station has initiated channel occupancy of the unlicensed frequency channel.

According to some embodiments, the baseband processor is further configured to perform operations comprising: determining a length of the uplink transmission, wherein whether to initiate channel occupancy of the unlicensed frequency channel is determined further based at least in part on the length of the uplink transmission.

According to some embodiments, the baseband processor is further configured to perform operations comprising: determining to initiate channel occupancy of the unlicensed frequency channel if the length of the uplink transmission is greater than a remaining length of channel occupancy initiated by the cellular base station or if the cellular base station has not initiated channel occupancy of the unlicensed frequency channel; and determining to not initiate channel occupancy of the unlicensed frequency channel if the length of the uplink transmission is less than the remaining length of channel occupancy initiated by the cellular base station.

According to some embodiments, the baseband processor is further configured to perform operations comprising: determining to initiate channel occupancy of the unlicensed frequency channel if the length of the uplink transmission is greater than a remaining length of a current fixed frame period of the cellular base station or if the cellular base station has not initiated channel occupancy of the unlicensed frequency channel; and determining to not initiate channel occupancy of the unlicensed frequency channel if the length of the uplink transmission is less than the remaining length of the current fixed frame period of the cellular base station.

According to some embodiments, the baseband processor is further configured to perform operations comprising: determining to initiate channel occupancy of the unlicensed frequency channel while the cellular base station has initiated channel occupancy of the unlicensed frequency channel; and performing the uplink transmission to the cellular base station on the unlicensed frequency channel, wherein the uplink transmission extends at least into a clear channel assessment period for a next fixed frame period of the cellular base station based at least in part on the channel occupancy being initiated while the cellular base station has already initiated channel occupancy of the unlicensed frequency channel.

According to some embodiments, the baseband processor is further configured to perform operations comprising: determining that the cellular base station has initiated channel occupancy of the unlicensed frequency channel; and determining autonomously whether to initiate channel occupancy of the unlicensed frequency channel or to share the channel occupancy initiated by the cellular base station to perform the uplink transmission to the cellular base station.

According to some embodiments, determining autonomously whether to initiate channel occupancy of the unlicensed frequency channel or to share the channel occupancy initiated by the cellular base station to perform the uplink transmission to the cellular base station further comprises: determining that the uplink transmission to the cellular base station can be performed using the channel occupancy initiated by the cellular base station without performing clear channel assessment; and determining to share the channel occupancy initiated by the cellular base station to perform the uplink transmission to the cellular base station based at least in part on determining that the uplink transmission to the cellular base station can be performed using the channel occupancy initiated by the cellular base station without performing clear channel assessment According to some embodiments, the baseband processor is further configured to perform operations comprising: determining a latency sensitivity of the uplink transmission, wherein whether to initiate channel occupancy of the unlicensed frequency channel or to share the channel occupancy initiated by the cellular base station to perform the uplink transmission to the cellular base station is determined further based at least in part on the latency sensitivity of the uplink transmission.

According to some embodiments, the baseband processor is further configured to perform operations comprising: determining to initiate channel occupancy of the unlicensed frequency channel; and determining an energy detection threshold to use to perform clear channel assessment of the unlicensed frequency channel.

Another set of embodiments may include a wireless device, comprising: an antenna; a radio operably coupled to the antenna; and a processor operably coupled to the radio; wherein the wireless device is configured to: establish a wireless link with a cellular base station; determine to perform an uplink transmission to the cellular base station on an unlicensed frequency channel; determine whether the cellular base station has initiated channel occupancy of the unlicensed frequency channel; and determine whether to initiate channel occupancy of the unlicensed frequency channel.

According to some embodiments, the wireless device is further configured to: determine whether the cellular base station has initiated channel occupancy of the unlicensed frequency channel based at least in part on whether the wireless device detects a downlink transmission from the cellular base station on the unlicensed frequency channel.

According to some embodiments, the wireless device is further configured to: determine whether the cellular base station has initiated channel occupancy of the unlicensed frequency channel based at least in part on one or more of: a field of a downlink control information downlink transmission from the cellular base station on the unlicensed frequency channel, wherein the field of the downlink control information is configured to indicate whether the cellular base station has initiated channel occupancy of the unlicensed frequency channel; or a reference signal configuration of reference signals received from the cellular base station on the unlicensed frequency channel, wherein the reference signal configuration is configured to indicate whether the cellular base station has initiated channel occupancy of the unlicensed frequency channel.

According to some embodiments, whether to initiate channel occupancy of the unlicensed frequency channel is based at least in part on one or more of: whether the cellular base station has initiated channel occupancy of the unlicensed frequency channel; whether the uplink transmission to the cellular base station can be performed using channel occupancy initiated by the cellular base station without performing clear channel assessment; a length of the uplink transmission; or a latency sensitivity of the uplink transmission.

According to some embodiments, the wireless device is further configured to: select an energy detection threshold to use to perform clear channel assessment of the unlicensed frequency channel based at least in part on a latency sensitivity of the uplink transmission, wherein the energy detection threshold is selected from at least a first energy detection threshold configured by the cellular base station and a second energy detection threshold calculated based at least in part on a maximum transmit power of the wireless device.

Yet another set of embodiments may include a cellular base station, comprising: an antenna; a radio operably coupled to the antenna; and a processor operably coupled to the radio; wherein the cellular base station is configured to: establish a wireless link with a wireless device; initiate channel occupancy of an unlicensed frequency channel; and provide an indication that the cellular base station has initiated channel occupancy of the unlicensed frequency channel.

According to some embodiments, the indication is provided in downlink control information provided by the cellular base station on the unlicensed frequency channel using a field of the downlink control information that is configured to indicate whether the cellular base station has initiated channel occupancy of the unlicensed frequency channel.

According to some embodiments, the indication is provided using a reference signal configuration that is configured to indicate whether the cellular base station has initiated channel occupancy of the unlicensed frequency channel.

According to some embodiments, the cellular base station is further configured to: perform a downlink transmission to the wireless device using channel occupancy of the unlicensed frequency channel initiated by the wireless device; and discard or puncture any broadcast or multicast signals or channels for the downlink transmission performed using the channel occupancy of the unlicensed frequency channel initiated by the wireless device.

According to some embodiments, the cellular base station is further configured to: determine that the wireless device has initiated channel occupancy of the unlicensed frequency channel; and determine that the cellular base station has one or more broadcast or multicast signals or channels to transmit; wherein the channel occupancy of the unlicensed frequency channel by the cellular base station is initiated while the wireless device has initiated channel occupancy of the unlicensed frequency channel based at least in part on the cellular base station having one or more broadcast or multicast signals or channels to transmit.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

Another exemplary set of embodiments may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor configured to perform operations comprising:
    determining to perform an uplink transmission to a cellular base station on an unlicensed frequency channel;
    determining that the cellular base station has initiated a first channel occupancy of the unlicensed frequency channel;

determining a length of the uplink transmission; and
determining whether to initiate channel occupancy of the unlicensed frequency channel or use the first channel occupancy, comprising:
  determining to initiate a new channel occupancy of the unlicensed frequency channel if the length of the uplink transmission would overlap a first idle period at an end of a current first fixed frame period of the cellular base station;
  determining to use the first channel occupancy of the unlicensed frequency channel if the length of the uplink transmission would not overlap the first idle period at the end of the current first fixed frame period of the cellular base station; and
  performing the uplink transmission to the cellular base station on the unlicensed frequency channel,
  wherein the uplink transmission extends at least into a clear channel assessment period for a next fixed frame period of the cellular base station based at least in part on the new channel occupancy being initiated while the cellular base station has already initiated channel occupancy of the unlicensed frequency channel.

2. The baseband processor of claim 1, the operations further comprising
  determining to share the first channel occupancy to perform the uplink transmission to the cellular base station based at least in part on determining that the uplink transmission to the cellular base station can be performed using the first channel occupancy without performing clear channel assessment.

3. The baseband processor of claim 1, the operations further comprising determining a latency sensitivity of the uplink transmission,
  wherein whether to initiate the new channel occupancy of the unlicensed frequency channel or to use the first channel occupancy initiated by the cellular base station is determined further based at least in part on the latency sensitivity of the uplink transmission.

4. The baseband processor of claim 1, wherein the baseband processor is further configured to perform operations comprising:
  determining an energy detection threshold to use to perform clear channel assessment of the unlicensed frequency channel.

5. The baseband processor of claim 1, wherein a first fixed frame period duration is different from a second fixed frame period duration.

6. A method, comprising:
  determining to perform an uplink transmission to a cellular base station on an unlicensed frequency channel;
  determining that the cellular base station has initiated a first channel occupancy of the unlicensed frequency channel;
  determining a length of the uplink transmission; and
  determining whether to initiate channel occupancy of the unlicensed frequency channel or use the first channel occupancy, comprising:
    determining to initiate a new channel occupancy of the unlicensed frequency channel if the length of the uplink transmission would overlap a first idle period at an end of a current first fixed frame period of the cellular base station;
    determining to use the first channel occupancy of the unlicensed frequency channel if the length of the uplink transmission would not overlap the first idle period at the end of the current first fixed frame period of the cellular base station; and
  performing the uplink transmission to the cellular base station on the unlicensed frequency channel,
  wherein the uplink transmission extends at least into a clear channel assessment period for a next fixed frame period of the cellular base station based at least in part on the new channel occupancy being initiated while the cellular base station has already initiated channel occupancy of the unlicensed frequency channel.

7. The method of claim 6, further comprising:
  determining to share the first channel occupancy to perform the uplink transmission to the cellular base station based at least in part on determining that the uplink transmission to the cellular base station can be performed using the first channel occupancy without performing clear channel assessment.

8. The method of claim 6, further comprising:
  determining a latency sensitivity of the uplink transmission,
  wherein whether to initiate the new channel occupancy of the unlicensed frequency channel or to use the first channel occupancy is determined further based at least in part on the latency sensitivity of the uplink transmission.

9. The method of claim 6, further comprising:
  determining an energy detection threshold to use to perform clear channel assessment of the unlicensed frequency channel.

10. The method of claim 6, wherein a first fixed frame period duration is different from a second fixed frame period duration.

11. A method, comprising:
  initiating, by a cellular base station, a first channel occupancy of an unlicensed frequency channel; and
  receiving, from a user equipment (UE), an uplink transmission on the unlicensed frequency channel, wherein:
    the uplink transmission is received during a new channel occupancy of the unlicensed frequency channel if a length of the uplink transmission overlaps a first idle period at an end of a current first fixed frame period of the cellular base station; or
    the uplink transmission is received during the first channel occupancy of the unlicensed frequency channel if the length of the uplink transmission does not overlap the first idle period at the end of the current first fixed frame period of the cellular base station, wherein the uplink transmission extends at least into a clear channel assessment period for a next fixed frame period of the cellular base station based at least in part on the new channel occupancy being initiated while the cellular base station has already initiated channel occupancy of the unlicensed frequency channel.

12. The method of claim 11, wherein uplink transmission is received during the first channel occupancy when the uplink transmission to the cellular base station can be performed using the first channel occupancy without performing clear channel assessment.

13. The method of claim 11, wherein a first fixed frame period duration is different from a second fixed frame period duration.

* * * * *